June 15, 1943. M. JENSEN 2,321,602
AUTOMOBILE JACK
Filed Aug. 26, 1941 2 Sheets-Sheet 1
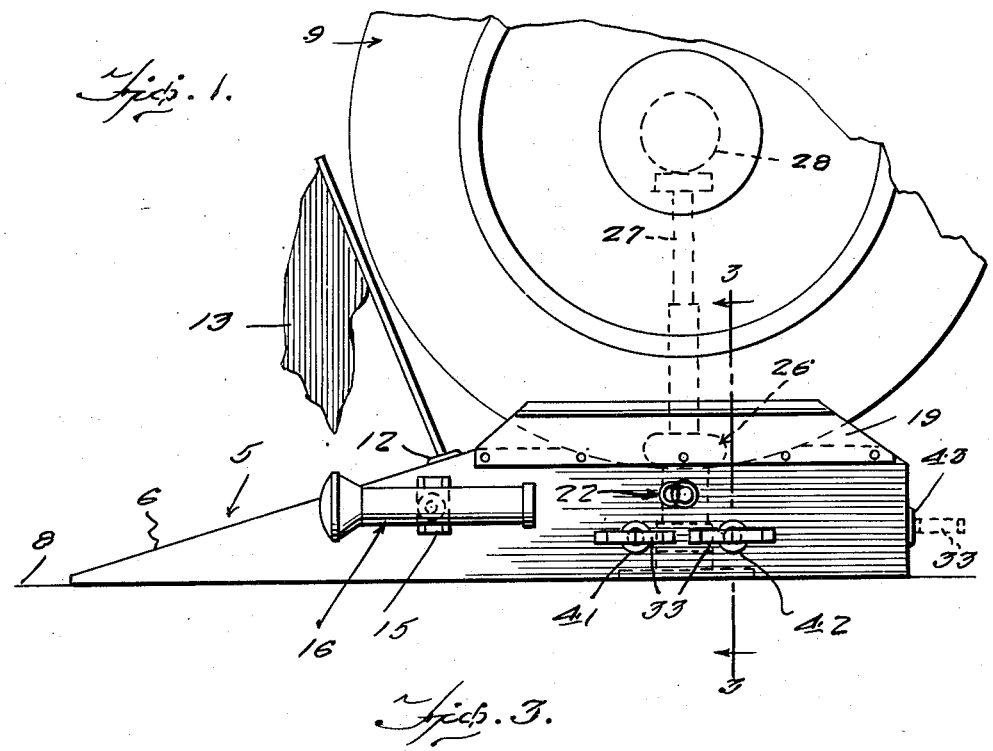
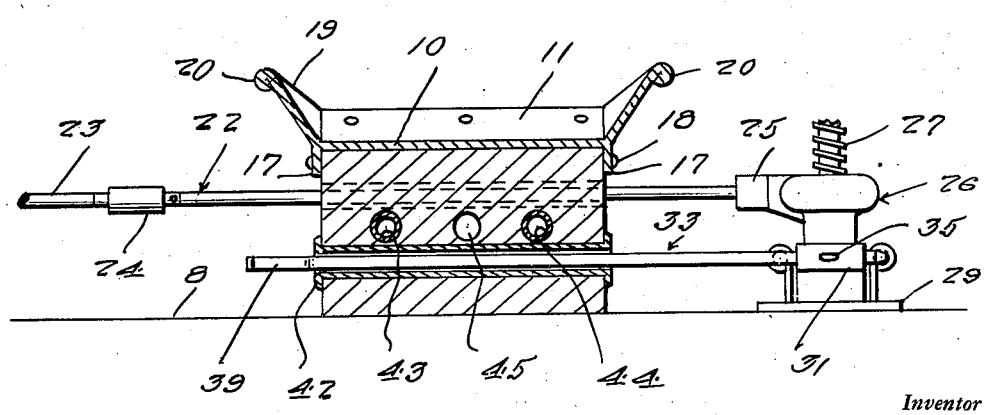
Inventor
Marthinus Jensen
By Clarence A. O'Brien
Attorney June 15, 1943. M. JENSEN 2,321,602
AUTOMOBILE JACK
Filed Aug. 26, 1941 2 Sheets-Sheet 2
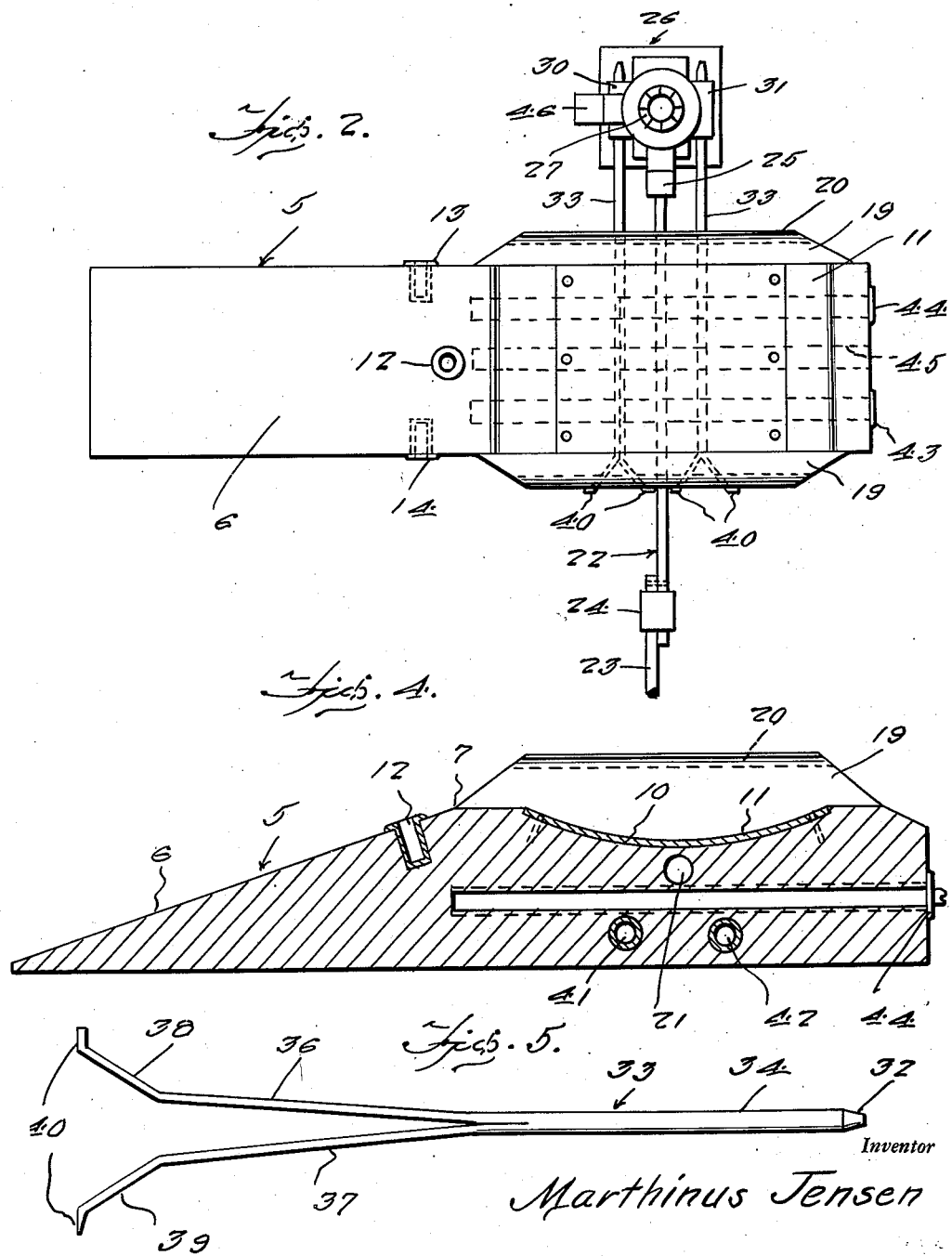

Patented June 15, 1943

2,321,602

UNITED STATES PATENT OFFICE 2,321,602

AUTOMOBILE JACK

Marthinus Jensen, Greenwich, Conn.

Application August 26, 1941, Serial No. 408,396

1 Claim. (Cl. 254—88)

My invention relates to improvements in automobile jacks and particularly to a portable jack especially adapted for facilitating the changing of wheels and tires on the road and under adverse light conditions, and the primary object of my invention is to provide a simple and efficient knock-down arrangement of the character indicated which when assembled and disposed relative to the wheel or tire to be handled, gives a correct alignment of the jack screw with the axle with provision of ramp means up which the wheel is to be run to achieve such alignment and assume an elevated condition with respect to the ground in which it may be held by the jack independent of the ramp.

Other important objects and advantages of the invention will be apparent from a reading of the following description taken in connection with the appended drawings, wherein for purposes of illustration I have shown a preferred embodiment of my invention.

In the drawings:

Figure 1 is a fragmentary outboard side elevational view of the embodiment showing the same in operative relation to the wheel and axle of an automobile.

Figure 2 is a top plan view of the assembled jack.

Figure 3 is a transverse vertical sectional view taken through Figure 1 along the line 3—3 and looking in the direction of the arrows.

Figure 4 is an enlarged vertical longitudinal sectional view taken through the ramp means.

Figure 5 is an enlarged top plan view of one of the aligning and holding rods.

Referring in detail to the drawings, the present invention contemplates the provision of a ramp element generally designated 5 which may be a solid or a semi-solid body of generally elongated rectangular form with the top of one end portion inclined from its terminal end as indicated by the numeral 6 to an intermediate point designated by the numeral 7 to provide the necessary lift from the ground level 8 when the wheel 9 is run up on the ramp element. The remainder of the top of the ramp element is level except for a longitudinally and downwardly curved portion 10 whose opposite ends act as chocks to retain the wheel 9 in the depression. Where the ramp element is made of non-metallic material the depression 10 is preferably provided with a wear-resisting metallic surface 11 which may be either metal or suitable composition. A warning flag socket 12 is suitably placed in the ramp surface 6 so that the warning flag required by regulations in certain States may be displayed when the block is removed from under the jacked up wheel and the block removed to a traffic warning position. On opposite sides of the upper part of the ramp portion 6 are provided sockets 13 and 14, respectively, adapted to mount a suitable bracket 15 to mount a flashlight 16 as indicated in Figure 1 of the drawings, to provide the necessary visible warning to traffic while using the device at night or under poor light conditions to afford light for repairs. If desired the flashlight may be inserted in the hole 12.

As indicated in Figure 3 of the drawings the plate 11 which lines the depression 10 extends the full width of the ramp body and has at its opposite lateral edges depending flanges 17 having fasteners 18 securing the same to the sides of the block, and with laterally outwardly and upwardly directed protective flanges 19 projecting from the lateral edges of the plate 11, with the upper edges thereof beaded as indicated by the numeral 20. The flanges 19 operate to guide the tire of the wheel 9 into proper position in the depression 10 and operate to confine the wheel on the ramp under adverse conditions.

The ramp body is provided with a transverse horizontal bore 21 slightly spaced under the depression 10 and intermediate the ends thereof to freely pass the jack operating rod 22 to which an extensible handle 23 may be attached by a conventional coupling 24. The rod 22 is freely rotatable and slidable in the bore 21 to reach and operate an operative connection 25 on the vertical screw jack which is generally designated 26 and which has extensible therefrom the jack screw 27 which is adapted to engage the axle or axle housing 28 on which the wheel 9 is supported, or other suitable part of the automobile for elevating the same to free the wheel 9 from the ground for wheel changing or tire changing operations. The jack 26 includes a base 29 to rest on the ground 8, the body of the jack above said base being characterized by opposite horizontally bored lugs 30 and 31 which are adapted to receive the tapered ends 32 on the terminal end of the rod portion 34 of the tension aligning and holding rods 33. Suitable spring gripping means 35 is provided in the said lugs to releasably hold the tapered ends of the rods 33. The opposite end portions of the rods 33 are bifurcated as indicated in Figure 5 of the drawings to provide the divergent spring legs 36 and 37 which have angularly and laterally directed terminal portions 38 and 39 with stops 40 at their extremities which may be used to pry off the hub cap of the wheel like a screw driver.

The aligning and holding rods 33 are adapted to be pushed through tubes 41 and 42 which are embedded in the ramp body adjacent the bottom thereof as indicated in Figures 3 and 4 until the spring legs 36 and 37 exert a holding tension on the interiors of the tubes and require some substantial force to be exerted on the rods 33 to thereafter effect removal or change of position. The rods 33 are thrust through the tubes 41 and 42 to engage in the bores in the lugs 30 and 31 to align and hold the jack 26 in the proper position relative to the wheel 9 so that when the operating rod 22 is turned the same will operate the jack screw 27 upwardly to properly engage the axle or axle housing 28.

The ramp body is provided with laterally spaced longitudinal lined bores 43 and 44 to accept the aligning and holding rods 33 when the device is not in use, and another plain bore 45 is provided between them to hold the warning flag 13 while the same is not in use, thereby making a compact arrangement for storing away in a convenient compartment on the automobile until wanted for use.

It is obvious that utilization of the device of the invention is preferably practiced by running the selected wheel 9 up on the ramp until it is in the depression 10 and thereby substantially elevated above the ground 8 and has its axle or the equivalent 28 in alignment with the screw of the jack. The jack is then operated to bring the screw into engagement with the axle or axle housing and to lift the same a sufficient amount to make the wheel 9 clear the ramp. Thereupon the ramp 5 may be removed and the change of wheel or tire made, following which the jack 26 may be operated by means of its optional operative connection 46 at right angles to the other connection 25, by means of the rod 22, to let the wheel down on the road surface 8 ready for travel, and the ramp replaced on the vehicle.

Although I have shown and described herein a preferred embodiment of my invention, it is to be definitely understood that I do not wish to limit the application of my invention thereto except as may be required by the scope of the subjoined claim.

Having described the invention, what is claimed as new is:

Vehicle wheel jacking apparatus comprising a ramp onto which the selected wheel of the vehicle is to be run to elevate the wheel and its axle or equivalent above the road surface on which the ramp rests, a jack to rest on said road surface at a point inboard of the wheel and having a vertically movable element to engage and lift said axle or equivalent, jack aligning and holding means operatively connected between said ramp and said jack to cause the vertically movable element of the jack to be in alignment with said axle or equivalent when the said vehicle wheel is in position on the ramp, said jack aligning and holding means comprising split resilient rods extending through said ramp to said jack and frictionally interlocking with said ramp.

MARTHINUS JENSEN.